(12) United States Patent
Palaniappan et al.

(10) Patent No.: US 11,803,651 B2
(45) Date of Patent: Oct. 31, 2023

(54) DYNAMICALLY GENERATED SMART CONTRACTS

(71) Applicant: PencilData, Inc., Livermore, CA (US)

(72) Inventors: Kumarappan Palaniappan, San Jose, CA (US); Valentin Bercovici, Livermore, CA (US)

(73) Assignee: PencilData, Inc., Livermore, CA (US)

( * ) Notice: Subject to any disclaimer, the term of this patent is extended or adjusted under 35 U.S.C. 154(b) by 447 days.

(21) Appl. No.: 16/225,938

(22) Filed: Dec. 19, 2018

(65) Prior Publication Data

US 2019/0188399 A1   Jun. 20, 2019

Related U.S. Application Data

(60) Provisional application No. 62/608,515, filed on Dec. 20, 2017.

(51) Int. Cl.
| | | |
|---|---|---|
| *G06F 21/62* | (2013.01) | |
| *H04L 9/06* | (2006.01) | |
| *G06F 21/64* | (2013.01) | |
| *H04L 9/32* | (2006.01) | |
| *H04L 9/00* | (2022.01) | |

(52) U.S. Cl.
CPC .......... *G06F 21/6209* (2013.01); *G06F 21/64* (2013.01); *H04L 9/0618* (2013.01); *H04L 9/3239* (2013.01); *H04L 9/50* (2022.05)

(58) Field of Classification Search
CPC ... G06F 21/6209; G06F 21/64; H04L 9/3239; H04L 9/0618; H04L 2209/38
See application file for complete search history.

(56) References Cited

U.S. PATENT DOCUMENTS

| | | | |
|---|---|---|---|
| 10,169,937 B1 * | 1/2019 | Zwink | G07C 9/23 |
| 10,460,283 B2 * | 10/2019 | Madisetti | H04L 9/3239 |
| 10,740,844 B2 * | 8/2020 | Stradling | H04L 63/105 |
| 10,824,746 B1 * | 11/2020 | Magerkurth | H04L 9/0825 |
| 10,824,759 B1 * | 11/2020 | Magerkurth | H04L 9/3247 |
| 2016/0171451 A1 * | 6/2016 | Pugh | G06Q 10/1091 |
| | | | 705/7.18 |
| 2017/0221052 A1 | 8/2017 | Sheng et al. | |

(Continued)

OTHER PUBLICATIONS

Egberts, Alexander, The Oracle Problem—An Analysis of how Blockchain Oracles Undermine the Advantages of Decentralized Ledger Systems (Dec. 12, 2017). (Year: 2017).*

(Continued)

*Primary Examiner* — Michael R Vaughan
(74) *Attorney, Agent, or Firm* — Perkins Coie LLP; Brian Coleman; Kristen Schunter

(57) ABSTRACT

A document source that generates, maintains, or distributes electronic documents receives a policy that defines for an electronic document, a set of guidelines for access to the electronic document. Based on the policy, the document source generates a smart contract including a set of rules that when executed change a user's access rights with respect to the document and publishes the smart contract to a blockchain. An oracle is triggered to input a user request related to an electronic document to the smart contract. Based on execution of at least one of the rules, the document source receives an indication of an access right for the user and enforces the access right with respect to the electronic document.

20 Claims, 4 Drawing Sheets

(56) References Cited

U.S. PATENT DOCUMENTS

| | | | |
|---|---|---|---|
| 2017/0287090 A1 | 10/2017 | Hunn et al. | |
| 2017/0301047 A1 | 10/2017 | Brown et al. | |
| 2018/0060496 A1* | 3/2018 | Bulleit | H04L 9/3268 |
| 2018/0225640 A1* | 8/2018 | Chapman | G06Q 20/0855 |
| 2018/0315141 A1* | 11/2018 | Hunn | G06F 40/42 |
| 2019/0065764 A1* | 2/2019 | Wood | G06F 21/6209 |
| 2019/0158671 A1* | 5/2019 | Feast | G06Q 10/10 |
| 2019/0268284 A1* | 8/2019 | Karame | H04L 9/3236 |
| 2020/0050780 A1* | 2/2020 | Uhr | G06F 21/10 |
| 2020/0382278 A1* | 12/2020 | Xu | H04L 63/0428 |

OTHER PUBLICATIONS

European Search Report and Written Opinion for PCT Application PCT/US20/18066484, dated May 31, 2021, 10 pages.
Azaria Asaph, et al., "MedRec: Using Blockchain for Medical Data Access and Permission Management", 2016 2nd International Conference on Open and Big Data (OBD), IEEE, Aug. 22, 2016, pp. 25-30.
Ramachandran Aravind, et al., "Using Blockchain and Smart Contracts for Secure Data Provenance Management", Arxiv.org, Cornell University Library, 201 Olin Library Cornell University, Ithaca, NY, Sep. 28, 2017, 11 pages.

* cited by examiner

US 11,803,651 B2

DYNAMICALLY GENERATED SMART CONTRACTS

CROSS-REFERENCE TO RELATED APPLICATION

This application claims the benefit of U.S. Provisional Application No. 62/608,515, filed on Dec. 20, 2017, which is incorporated herein by reference in its entirety.

TECHNICAL FIELD

The present disclosure relates to dynamically generated smart contracts.

BACKGROUND

Electronic data provides a number of advantages, including ease of access and dissemination. These advantages carry associated tradeoffs, however. Data that is easily distributed, for example, can be readily acquired by a person who may use the data for a malicious purpose or ill-gotten gain. It is therefore desirable to balance the advantages provided by electronic data against access control policies to ensure that data is accessible to those who need it and not accessible to those who may use it nefariously.

DETAILED DESCRIPTION

A smart contract dynamically enforces access to electronic documents. In some embodiments, a document source that generates, maintains, or distributes electronic documents receives a policy that defines for an electronic document, a set of guidelines for access to the electronic document. Based on the policy, the document source generates a smart contract comprising a set of rules that when executed change a user's access rights with respect to the document. The document source publishes the smart contract to a blockchain. An oracle is triggered to input a user request related to an electronic document to the smart contract. Based on execution of at least one of the rules, the document source receives an indication of an access right for the user and enforces the access right with respect to the electronic document.

In some embodiments, a non-transitory computer-readable storage medium stores a smart contract comprising computer program instructions that, when executed by a processor, cause the processor to receive a user request directed to an electronic document. Based on the user request, at least one rule in a set of rules is executed. Each rule specifies a respective condition for access to the electronic document. When executed, the at least one rule causes the smart contract to output an access right if the respective condition is satisfied. The computer program instructions also cause the processor to output the access right by an oracle, and the access right when output enables enforcement of access to or use of the electronic document.

The smart contract described herein provides flexible, dynamic access control to electronic documents. In some embodiments, because the smart contract can be stored on a blockchain, the rules by which access to the document is controlled are immutable and tamper-proof, ensuring accurate application of the rules to any user who may attempt to access a document.

Figure 1:
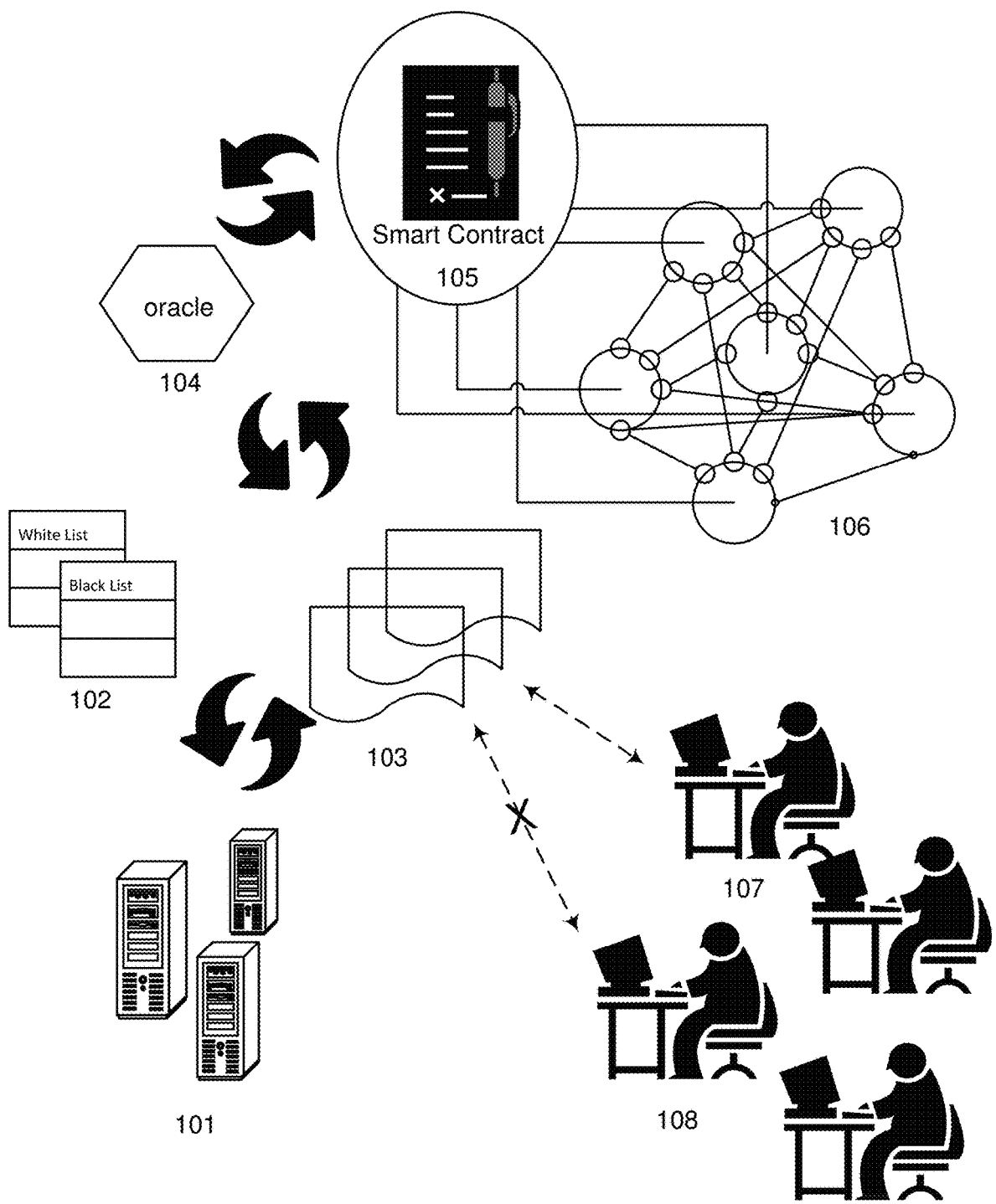
FIG. 1 illustrates an example of generating and using dynamic smart contracts to control access to data.

FIG. 1 illustrates an example of generating and using dynamic smart contracts to control access to data. Servers 101 represent servers storing electronic documents 103 and/or data relevant to executing a smart contract. For example, the servers 101 are maintained by a hospital, and store patient medical records, medical staff schedules, patient locations, and user accounts of medical staff.

A smart contract 105 is generated based on a policy. The smart contract 105 can identify information about an electronic document 103, including who can view the document, when they can view it, and what they can do with it. The smart contract 105 can be stored on a blockchain 106 and, when executed, can generate access rights for the electronic document. For example, the smart contract 105 can automatically grant a user access to an electronic document if the user meets one or more parameters specified in the policy. The smart contract can also automatically revoke access to the electronic document if the user no longer meets the policies, or if the user attempts to perform a prohibited action.

Rules or policies can be used to generate oracles associated with the smart contract. In some embodiments, the oracles 104 can be generated to retrieve information from the servers 101 or other sources and provide the information to the smart contract 105. For example, in the patient data example, the medical staff schedules can change day-to-day. Nurse A may be able to access patient record B every Monday during her day shift, but when she takes off work one Monday, she would not be permitted to access the record of patient B. If she takes a colleague's night shift one Friday, the smart contract grants her access to the patient record for her adopted shift.

A smart contract 105 that permits access based on dynamic external information can receive the data from an oracle 104. The oracle can be a service independent of the smart contract 105 or servers 101 or can be executed by the servers 101. Oracles can collect information from sources such as servers 101. The oracles 104 can additionally or alternatively collect a whitelist 102 (identifying users who can access data) or a blacklist 102 (identifying users who cannot access data). The oracles 104 can transmit the collected information to the smart contract 105. In some embodiments, the smart contract 105 can request the information from the oracles. In some embodiments, the oracles can watch for changes in user behaviors or characteristics and push the changes to the smart contract.

In the example of FIG. 1, the smart contract grants a first user 107 access to the document 103, while denying access to a second user 108. For example, the first user 107 can be a nurse currently scheduled to work and the second user 108 can be a nurse who is not currently scheduled to work. However, when the second user's shift begins, the smart contract may automatically grant access to the second user 108. The first user's access may be revoked automatically when the first user's shift ends.

Figure 2:
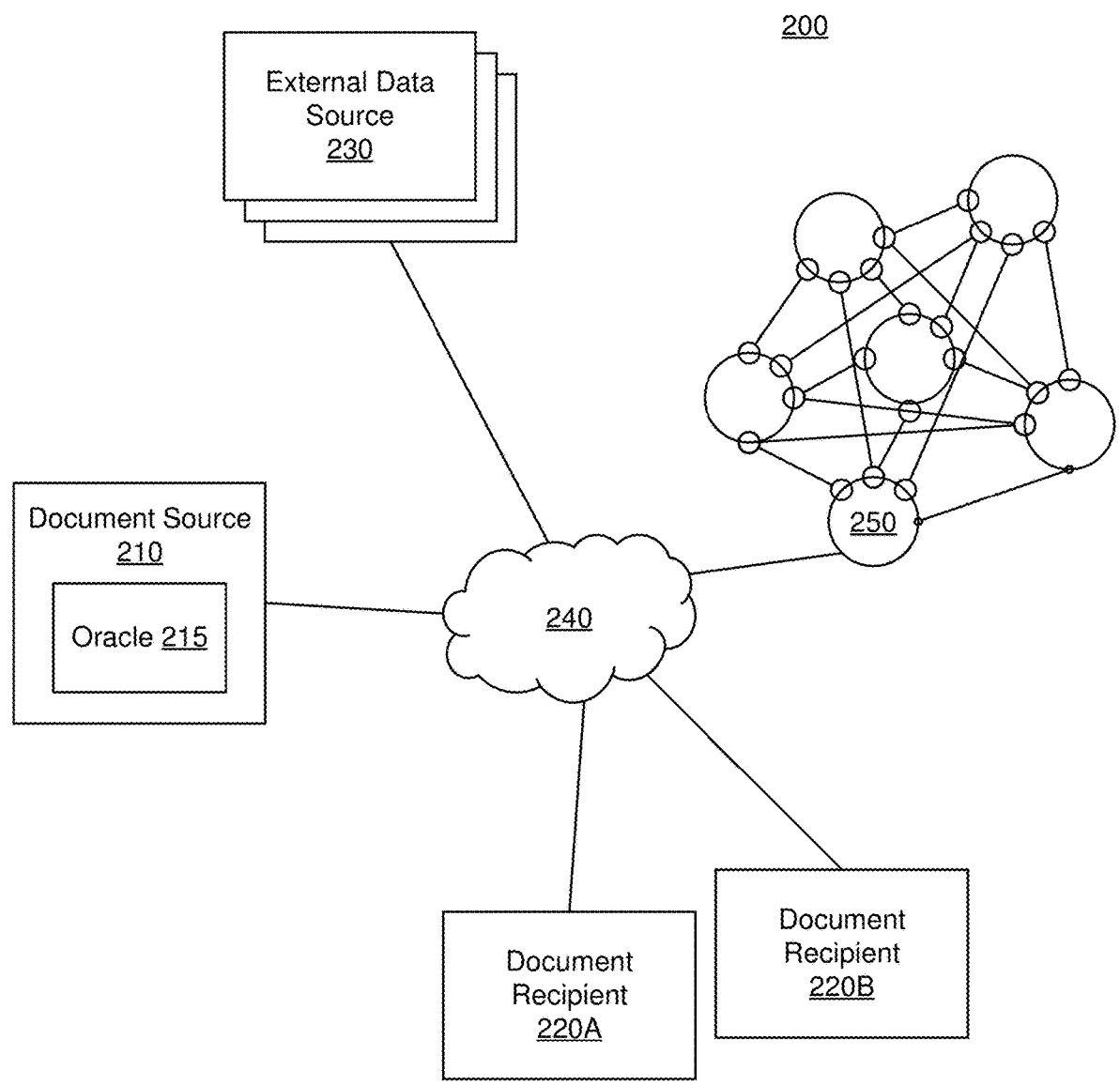
FIG. 2 is a block diagram illustrating an environment in which smart contracts are generated and used to control access to electronic documents.

FIG. 2 is a block diagram illustrating an environment 200 in which smart contracts are generated and used to control access to electronic documents, according to one embodiment. As shown in FIG. 2, the environment 200 can include a document source 210, one or more document recipients 220, and external data sources 230, which can communicate over a network 240 and access data stored on a blockchain or distributed ledger 250. The environment 200 may include additional or fewer devices. For example, the environment 200 may include multiple document sources 210 or more than two document recipients 220.

The document source 210 generates, maintains, and/or distributes electronic documents. The document source 210 can comprise any computing device with storage and processing capabilities, such as a server or personal computer. In some cases, the document source 210 can include multiple computing devices. For example, the document source 210 may include a server configured to store data and a personal computer used by an administrator of the data to access, update, and distribute the data stored on the server. The document source 210 can, in some cases, be affiliated with an enterprise, such as a company, hospital, or government agency.

The electronic documents generated, maintained, or distributed by the document source 210 comprise electronic data that is distributable to or accessible by the document recipients 220. As used herein, an electronic document represents a set of data configured such that user access or permissions for the data can be controlled by a smart contract. Example electronic documents may include word processing documents, spreadsheets, databases, electronic books, medical records, software, or code repositories. In some cases, the document source 210 enables user access to documents through a web portal, document management system, or other system that generates a user interface for navigating through available documents. For example, after a user logs into a user account with the document source 210 (e.g., by providing login credentials such as a username and password), the document source 210 can send a portal interface to the user's device that allows the user to search for documents and request access to desired documents.

The document source 210 generates smart contracts that control access rights associated with electronic documents. A smart contract generated by the document source 210 identifies a document and comprises software code with one or more executable rules. Each rule can be configured to execute if a specified condition exists, and, when executed, may output a determination of an access right related to the electronic document identified by the smart contract. Based on the access rights, the document source 210 grants or denies a user rights to perform an action related to the document. Any of a variety of actions may be enforced by the document source 210 based on the access rights, including accessing a document, editing the document, printing the document, taking screenshots of the document, or sharing the document with another user. The document source 210 may generate a smart contract for each electronic document stored by the source 210, or a smart contract may output access rights for multiple documents. Once generated, the document source 210 publishes the smart contracts to the blockchain 250.

The document source 210 can generate a smart contract based on a policy received from an administrator. The policy may contain at least one parameter that defines an access right and a condition under which the access right will be applied. Parameters in the policy may be described by natural language expressions or by structured inputs. The policy may additionally or alternatively include a whitelist, identifying particular users or document recipients 220 who should be granted access to a document, or a blacklist, identifying particular users or document recipients 220 who should not be granted access to a document. To generate the smart contract, the document source 210 can analyze the policy to extract the parameters, whitelist, or blacklist and generate executable rules based on the parameters, whitelist, or blacklist. A process for generating the smart contract is described further with respect to FIG. 3.

The document source 210 can execute an oracle 215, comprising a process that transmits data to or receives data from the smart contract stored on the blockchain 250. In various embodiments, the oracle 215 can include computer code executable by a processor of the document source 210, a self-contained hardware module, or a combination of software and hardware. Although the oracle 215 is illustrated in FIG. 2 as being executed by the document source 210, the oracle 215 can instead be executed by another computing device such as the document recipient 220 or external sources 230. Additional oracles may also be executed by the document source 210 or other devices in the environment 200. The oracle 215 can be configured to receive access requests from users and pass data related to the access request to the smart contract for executing the rules. The oracle 215 can also receive access rights determined by the smart contract in response to execution of the rules, and can enforce the access rights at the document source 210. In some cases, the oracle 215 is configured to retrieve data from the document source 210 or external data sources 230 that relate to conditions of the rules in a smart contract and pass the data to the contract for executing the rules. The oracle 215 may store an identifier of the locations of the data pertaining to conditions in a smart contract, such as an identifier of the data source 230 or a memory location of the data stored on the document source 210. In response to receiving an access request for a document, the oracle 215 can automatically retrieve the data from the identified locations and transmit the data to the smart contract with the access request. In some embodiments, the oracle 215 can call other oracles to retrieve data and transmit the data to the smart contract for execution of the rules.

In some cases, the document source 210 may write an electronic document into a smart contract. When the contract is executed, the contract can directly output the document to a document recipient 220 for display to a user. In other cases, the smart contract may control access to or permissions associated with a document stored by the document source 210. For example, the smart contract when executed can grant or deny a user's access to a document stored by the document source 210 or can control permissions by enabling or disabling printing functionality, screen capture functionality, read/write permissions, or permissions related to sharing the document with other users. The smart contract can, for example, output a key to decrypt the document. In still other cases, execution of a smart contract may cause dynamic modifications to an access control list for a filesystem or content management system containing the document.

The document recipients 220 comprise computing devices used by respective users to request access to electronic documents and to interact with the documents. The document recipients 220 may comprise personal computers, mobile phones, tablets, or other computing devices. In some cases, each document recipient 220 is associated with a unique device identifier, such as a MAC address, that is transmitted to the document source 210 when a user requests access to a document using the recipient 220. In other cases, the user may provide a unique user identifier that is transmitted to the document source 210. For example, the user may use the document recipient 220 to log into an account with the document source 210, providing login credentials that uniquely identify the user. Other users may provide information that uniquely identifies the user to an enterprise associated with the document source 210, such as an employee number or badge number. The document recipient 220 may also collect information describing the device, its location, or how the user uses the device, and transmits the information to the document source 210. For example, the document recipient 220 contains a GPS sensor that can detect a location of the recipient 220. As another example, the document recipient 220 sends the document source 210 information about failed user attempts to log in to the device or reports of user activity on the device such as the use of screen capture functions or printing functions.

The external data sources 230 store data that may be relevant to whether a document recipient 220 can access a document. Data from one or more of the data sources 230 can be retrieved by an oracle and provided to a smart contract stored on the blockchain 250, where it may be used to grant or deny access to a document or change access permissions for a document. The external data sources 230 may comprise servers, personal computers, databases stored by a computing device, or other storage devices, and may be associated with or not associated with the document source 110. For example, in some embodiments, the document source 110 stores an external data source 230. Some external data sources 230 may reside within the same enterprise as a document source 210. Other external data sources 230 may provide an application programming interface (API), through data stored by the source 230 can be accessed.

Example external data sources 230 include a hospital server that stores information about work schedules of its medical staff, patient locations, and user accounts of the medical staff. The data stored by the hospital server may be dynamically updated as staff schedules change or when patients are moved. Another example data source 230 is a security system for a building that records passage of people through the building, for example by swipes of a card key. Still another example data source 230 is a GPS server that receives global positioning data from user devices, such as the document recipients 220.

The network 240 enables communication between the document source 210, document recipients 220, external data sources 230, and/or any devices storing the blockchain 250. The network 240 may include one or more local area networks (LANs), wide-area networks (WANs), metropolitan area networks (MANs), and/or the Internet.

The blockchain 250 comprises a distributed ledger storing transactions or states by a plurality of decentralized nodes. The blockchain 250 may comprise a publicly-available blockchain, such as the Bitcoin or Ethereum blockchains, or may be a private or semi-public blockchain. For example, an enterprise affiliated with the document source 210 may maintain its own blockchain 250 stored on devices that communicate over a local or private network.

Figure 3:
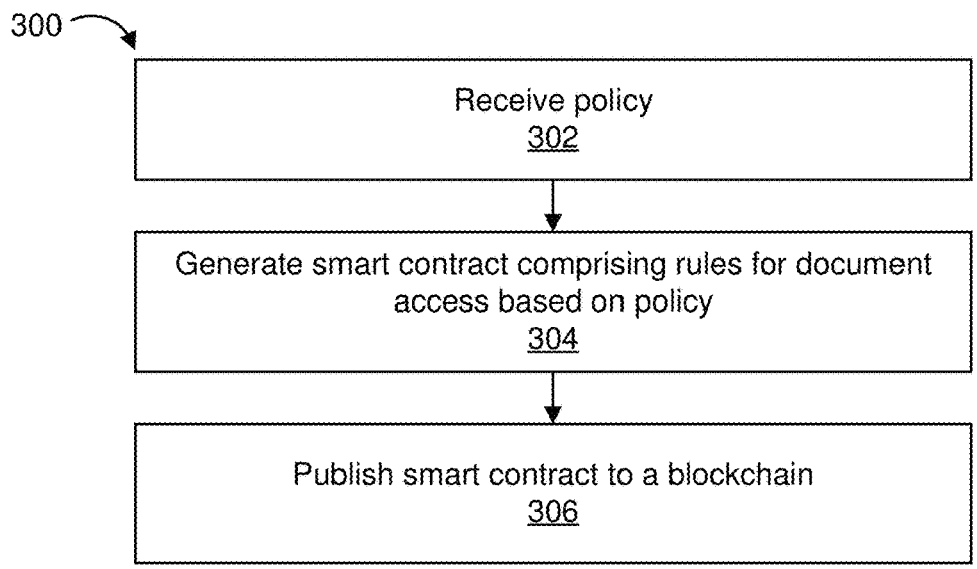
FIG. 3 is a flowchart illustrating a process for generating a smart contract to dynamically control access to electronic documents.

FIG. 3 is a flowchart illustrating a process 300 for generating a smart contract to dynamically control access to electronic documents, according to one embodiment. The process 300 may be executed by the document source 210. Other embodiments of the process 300 may include additional, fewer, or different steps, and the steps may be performed in different orders.

The document source 210 receives 302 a policy that identifies a document and at least one parameter for accessing the document. Some parameters may specify a condition that, if satisfied by a user, should result in the user being granted or denied access to the document. For example, a parameter may specify that a user can access a document during the user's scheduled work hours, but otherwise will be denied access to the document. As another example, a parameter may specify that a user will be denied access to a document if the user forwards the document to another person. Other parameters may specify a condition that causes a user to gain or lose particular access rights to a document. For example, a parameter may specify that any users outside a particular geographic region will only have "read" permissions for a document, while users within the geographic region will have "read" and "write" permissions. The policy may additionally or alternatively include a whitelist or a blacklist.

The parameters in the policy may be described by natural language expressions. For example, an administrator may write a policy that describes conditions for granting or denying access to a document, such as "when the user is scheduled to work," "if the user forwards the document link," or "if the user has submitted a proposal." Alternatively, an administrator may create parameters for the policy by structured inputs. For example, the document source 210 maintains a form that can be filled by an administrator to create a policy, with checkboxes or radio buttons for user characteristics or behaviors. The administrator can select, from the form, particular user characteristics or behaviors that should result in granted or denied access to a document or changed permissions with respect to the document. For example, the form may state "Grant access to users who:" or "Allow users to edit the document if:" each followed by a list of checkboxes for characteristics such as location or work schedule.

Based on the policy, the document source 210 generates a smart contract configured to dynamically enforce document access restrictions. The smart contract contains at least one rule that, if satisfied, causes the smart contract to change a user's rights to an electronic document. In some cases, the rules in the smart contract are generated based on the parameters specified in the policy. If the parameters comprise natural language expressions, the document source 210 may generate 304 the smart contract by applying a semantic analysis to the natural language expressions. For example, a parameter may contain the expression, "If a user is off work, deny access." The document source 210 parses and analyzes the expression to extract a condition (off work) and a result (access denied), and generates an executable rule that causes the specified result if the condition is satisfied. Similarly, if the parameters comprise data structures input through a form, the document source 210 can generate the smart contract by mapping fields on the data structures to portions of executable rules.

In some embodiments, the rules in the smart contract are generated by machine learning. The document source 210 may apply a model that predicts appropriate rules or external data sources for a particular type of document. For example, for a set of documents comprising patient medical records, the document source 210 can apply a machine learning algorithm that identifies the relevant tables where patient data is stored and relevant tables where healthcare professional schedules are stored. Alternatively, based on the classification of the documents as medical records and the provision of healthcare professional schedules, the machine learning algorithm generates a rule for inclusion in the smart contract that allows healthcare professions access to the medical records based on their work schedules.

The document source 210 publishes 306 the smart contract to the blockchain 250. Once published on the blockchain 250, the smart contract can be triggered by an oracle to execute at least one of the rules and output a determination of access rights for a document recipient 220.

Figure 4:
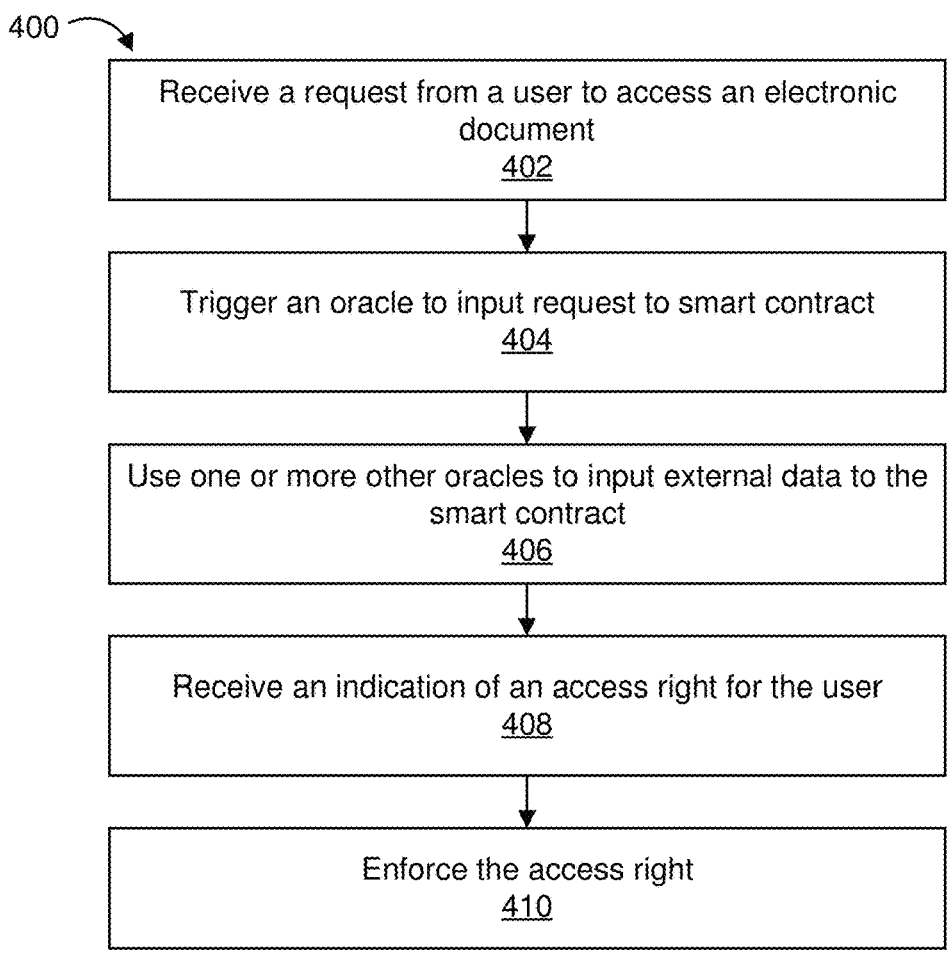
FIG. 4 is a flowchart illustrating a process for dynamically enforcing access rights to an electronic document using a smart contract.

FIG. 4 is a flowchart illustrating a process 400 for dynamically enforcing access rights to an electronic document using a smart contract, according to one embodiment. The process 400 may be executed by the document source 210. Other embodiments of the process 400 may include additional, fewer, or different steps, and the steps may be performed in different orders.

As shown in FIG. 4, the document source 210 receives 402 a request from a user to access an electronic document. The user may request the document using a document recipient 220, and the request may include information about the user or the device 220. For example, the request may include an identifier of the user (such as a username associated with an account on the document source 110, or an employee identification number for a company associated with the document source 110), an identifier of the document recipient 220 (such as an IP address or a MAC address), and/or a characteristic of the user or document recipient 220 (such as a current geographic location of the recipient 220).

In response to receiving the request, the document source 210 triggers 404 an oracle to input the request to a smart contract stored on the blockchain 250 and associated with the requested document. The oracle comprises software or hardware that passes information from a source outside the blockchain 250 to the smart contract. The oracle can pass data received with the request to the smart contract, such as the identifier or characteristic of the user or document recipient 220.

The document source 210 may also use 406 one or more other oracles to input external data to the smart contract that is relevant to determining the access rights of the user. The one or more other oracles may be executed by the document source 210 or may be executed by other devices and invoked by the oracle that passes the access request to the smart contract. Each oracle may be configured to retrieve data from an external data source 230 and pass the data to the smart contract. For example, an oracle may use an employee identification number of the user to access the user's work schedule, as stored in a database in an external data source 230, and pass information about whether the user is currently scheduled to work to the smart contract.

Using data passed by the oracles, the smart contract may execute one or more rules that specify conditions for access to the electronic document. When executed, the rules can cause the smart contract to output an access right for the document. For example, a rule may output an access right that indicates that a user may or may not access the document, may or may not edit the document, or may or may not copy content from the document.

The document source 210 receives 408 the access right determined by the smart contract and enforces 410 the access rights. If, for example, an access right indicates that the user has permission to access the document, the document source 210 grants the user access. If an access right specifies permissible actions related to the document, such as copying text or printing the document, the document source 210 grants the user rights to perform the specified actions. Any action not specified as permissible may be denied. However, in other cases, the access right may specify impermissible actions, and the document source 210 enforces 410 the access rights by denying any impermissible action and allowing the user to perform any other actions related to the document.

A user's access rights to a document can be dynamically changed in response to changes in the user's behavior or characteristics. An oracle, such as the oracle 215, can monitor for changes in the user behavior or characteristics and pass information about any changes to the smart contract. For example, a user who has been granted access to a document forwards a link to the document to another user. An oracle receives a notification that the document was forwarded, passes the notification to the smart contract, and the smart contract in response causes the document source 210 to revoke the user's access to the document. As another example, a user who is scheduled to work until 5:00 PM has access to a document until that time, and the smart contract causes revocation of the access after 5:00 PM. In yet another example, a user has write permissions for a document while the user is located inside a geofence, but the smart contract revokes the write permissions (e.g., giving the user read-only access) when the user moves outside the geofence.

In an example use of the processes described in FIGS. 3-4, a smart contract can be generated that controls access to patient medical records. The rules of the smart contract can output access rights that deny access to the medical records unless the requesting user is a medical professional who is scheduled to work during the time of access in the unit where the patient is located. The rule can include a limitation on forwarding, printing, and taking a screenshot of the patient data. When a user requests access to the medical record, an oracle can pass the request to the smart contract and generate a query to a list of medical personnel, medical personnel work schedules, and patient location records. One or more rules of the smart contract are executed using the data received based on the query. If the requesting user meets the conditions of a rule, the smart contract outputs an access right to the document source 210 indicating whether the user's access should be granted or denied. The document source 210 can, in turn, grant or deny the user's access. When a characteristic of the user changes (e.g., if the user's scheduled work shift comes to an end), the smart contract can execute again to update whether the user should be granted or denied access. Furthermore, if the user is granted access but attempts to perform one of the prohibited actions (forwarding, printing, or screenshotting portions of the medical records), the smart contract may execute to revoke the user's access to the records.

In another example, the smart contracts described herein can be used to manage a smart request for proposal (RFP) process. A rule associated with an RFP submission can indicate that eligible vendors can access an RFP. Once the bidding process is closed for new submissions, all vendors who did not apply would not be allowed to access the RFP. Furthermore, vendors who are eliminated through the steps in the selection process would have their access revoked, and the ultimate winner would have access revoked once the project is complete.

Example Computer System

Figure 5:
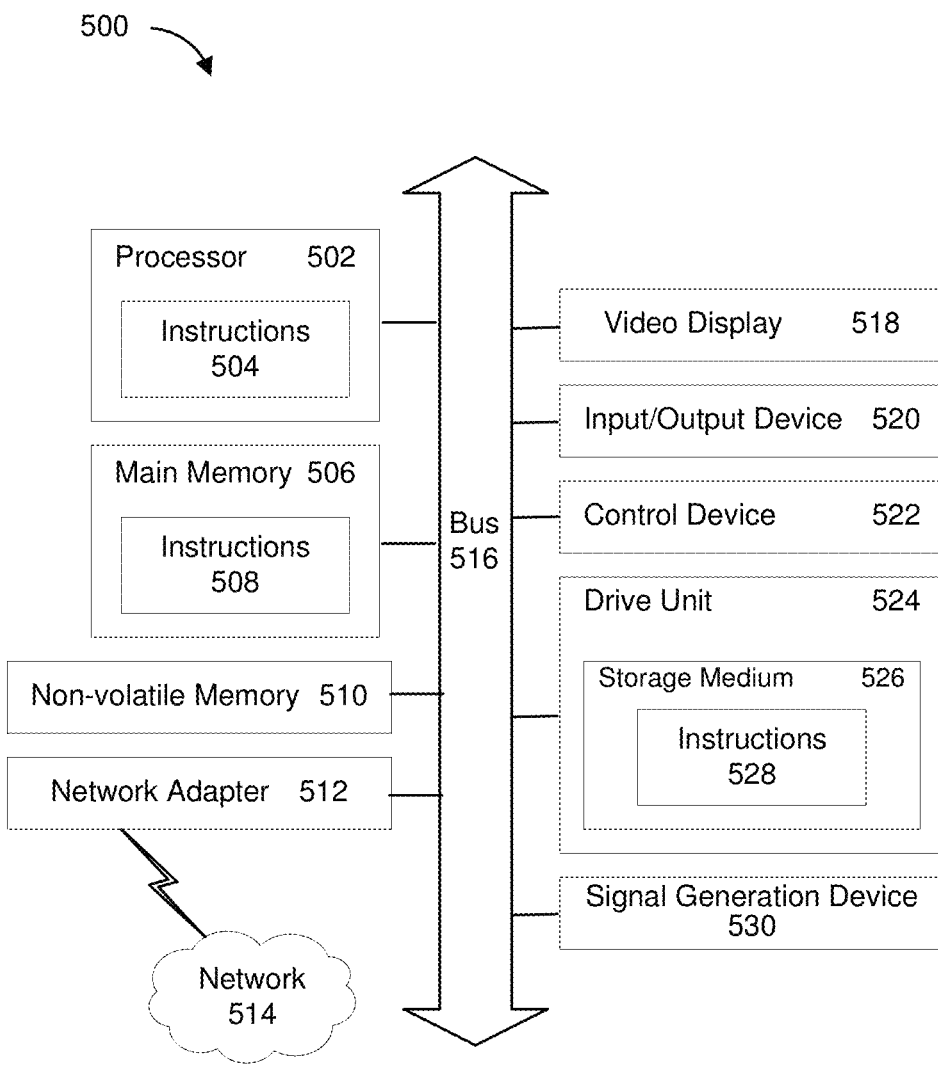
FIG. 5 is a block diagram illustrating an example of a processing system in which at least some operations described herein can be implemented.

FIG. 5 is a block diagram illustrating an example of a processing system 500 in which at least some operations described herein can be implemented. For example, one or more of the document source 210 or document recipients 220 may be implemented as the example processing system

500. The processing system 500 may include one or more central processing units ("processors") 502, main memory 506, non-volatile memory 510, network adapter 512 (e.g., network interfaces), video display 518, input/output devices 520, control device 522 (e.g., keyboard and pointing devices), drive unit 524 including a storage medium 526, and signal generation device 530 that are communicatively connected to a bus 516. The bus 516 is illustrated as an abstraction that represents any one or more separate physical buses, point to point connections, or both connected by appropriate bridges, adapters, or controllers. The bus 516, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 594 bus, also called "Firewire."

In various embodiments, the processing system 500 operates as part of a user device, although the processing system 500 may also be connected (e.g., wired or wirelessly) to the user device. In a networked deployment, the processing system 500 may operate in the capacity of a server or a client machine in a client-server network environment, or as a peer machine in a peer-to-peer (or distributed) network environment.

The processing system 500 may be a server computer, a client computer, a personal computer, a tablet, a laptop computer, a personal digital assistant (PDA), a cellular phone, a processor, a web appliance, a network router, switch or bridge, a console, a hand-held console, a gaming device, a music player, network-connected ("smart") televisions, television-connected devices, or any portable device or machine capable of executing a set of instructions (sequential or otherwise) that specify actions to be taken by the processing system 500.

While the main memory 506, non-volatile memory 510, and storage medium 526 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 528. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 504, 508, 528) set at various times in various memory and storage devices in a computer, and that, when read and executed by one or more processing units or processors 502, cause the processing system 500 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution. For example, the technology described herein could be implemented using virtual machines or cloud computing services.

Further examples of machine-readable storage media, machine-readable media, or computer-readable (storage) media include, but are not limited to, recordable type media such as volatile and non-volatile memory devices 510, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 512 enables the processing system 500 to mediate data in a network 514 with an entity that is external to the processing system 500 through any known and/or convenient communications protocol supported by the processing system 500 and the external entity. The network adapter 512 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 512 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

The invention claimed is:

1. A method comprising:
   receiving at a data source that maintains an electronic document, a request from a user to perform an action related to the electronic document at a specified time, the request including a user identifier of the user;
   in response to receiving the request, triggering, by the data source, an oracle to retrieve active work shift data associated with the user identifier from a database of active work shifts, wherein the active work shift data associated with the user identifier indicates whether the user identifier is associated with an active work shift at the specified time;
   triggering, by the data source, the oracle to input the request and the active work shift data associated with the user identifier to a smart contract stored on a blockchain, the smart contract including a set of rules, each rule in the set of rules specifying a respective condition for access to the electronic document and specifying as output a determined access right with respect to the electronic document when the respective condition is satisfied, the set of rules including a first rule that compares an accessing user identifier to a set of users associated with an active work shift at a present time, wherein users not associated with the active work shift at the present time cannot satisfy the respective condition associated with the first rule, wherein the smart contract is separate from the electronic document;

receiving at the data source, from the smart contract, responsive to execution of the first rule based on the active work shift data associated with the user identifier, an indication of an access right for the user; and in response to the access right indicating the action is permissible, enabling, by the data source, the action related to the electronic document.

2. The method of claim 1, wherein the action comprises accessing the electronic document.

3. The method of claim 1, wherein the action comprises editing the electronic document, printing the electronic document, performing a screen capture on the electronic document, or sharing the electronic document.

4. The method of claim 1, further comprising calling one or more other oracles, each other oracle configured to retrieve data related to a condition specified by a rule in the set of rules and provide the retrieved data to the smart contract.

5. The method of claim 1, wherein the request from the user is received while the user is granted access to the electronic document, and wherein the method further comprises:
receiving an event related to use by the user of the electronic document;
passing, by the oracle, the event to the smart contract, wherein the smart contract is configured to execute one or more of the rules in the set of rules based on the event and output a modified access right for the electronic document; and
determining whether to permit the action based on the modified access right.

6. The method of claim 1, further comprising:
receiving from the smart contract, a modified access right for the electronic document based on automatic execution of a rule in response to a triggering event; and
determining whether to permit the action based on the modified access right.

7. A non-transitory computer-readable storage medium storing a smart contract comprising computer program instructions, execution of which by a processor causes the processor to:
receive from a data source that maintains an electronic document, a user request to access or use the electronic document at the data source at a specified time, the user request including a user identifier of the user;
retrieve active work shift data associated with the user identifier from a database of active work shifts, wherein the active work shift data associated with the user identifier indicates whether the user identifier is associated with an active work shift at the specified time;
execute based on the user request and the active work shift data associated with the user identifier, at least one rule in a set of rules that each specify a respective condition for access to the electronic document, execution of the at least one rule causing the smart contract to output an access right when the respective condition is satisfied, the set of rules including a first rule that compares an accessing user identifier to a set of users associated with an active work shift at a present time, wherein users not associated with the active work shift at the present time cannot satisfy the respective condition associated with the first rule, wherein the smart contract is separate from the electronic document; and in response to the access right indicating the access or use is permissible based on the active work shift data associated with the user identifier, output the access right by a first oracle, the access right when output causing the data source to enable the requested access to or use of the electronic document.

8. The non-transitory computer-readable storage medium of claim 7, wherein the user request comprises a request to perform an action related to the electronic document, and wherein the action is denied based on the access right.

9. The non-transitory computer-readable storage medium of claim 8, wherein the action comprises accessing the electronic document.

10. The non-transitory computer-readable storage medium of claim 8, wherein the action comprises editing the electronic document, printing the electronic document, performing a screen capture on the electronic document, or sharing the electronic document.

11. The non-transitory computer-readable storage medium of claim 7, further comprising:
receiving by a second oracle, data related to a condition specified by a rule in the set of rules; and
executing the at least one rule using the received data.

12. The non-transitory computer-readable storage medium of claim 7, further comprising:
receiving by a second oracle, a notification of a triggering event related to the conditions specified by the rules;
executing at least one rule in the set of rules based on the notification; and
outputting a modified access right, wherein the access to or use of the electronic document is enforced based on the modified access right.

13. A method comprising:
receiving, at a data source that maintains an electronic document, a policy that defines for the electronic document, a set of guidelines for access to the electronic document;
generating by the data source, based on the policy, a smart contract including a set of rules that when executed change a user's access rights with respect to the document, the set of rules including a first rule that compares an accessing user identifier to a set of users associated with an active work shift at a present time, wherein users not associated with the active work shift at the present time cannot satisfy the respective condition associated with the first rule, and wherein the smart contract is separate from the electronic document;
publishing, by the data source, the smart contract to a blockchain;
triggering, by the data source, an oracle to input a user request related to an electronic document to the smart contract, wherein the user request includes a request from a user to perform an action related to the electronic document at a specified time and includes a user identifier of the user, and wherein trigger the oracle to input the user request to the smart contract comprises:
causing the oracle to retrieve active work shift data associated with the user identifier from a database of active work shifts, wherein the active work shift data associated with the user identifier indicates whether the user identifier is associated with an active work shift at the specified time, and causing the oracle to input the active work shift data associated with the user identifier to the smart contract;

receiving from the smart contract, based on execution of the first rule based on the active work shift data associated with the user identifier, an indication of an access right for the user; and in response to the access right indicating an action associated with the user request is permissible, enabling, by the data source, the user request.

14. The method of claim 13, wherein a guideline in the policy comprises a natural language expression, and wherein generating the smart contract comprises parsing the natural language expression and generating an executable rule based on the parsed expression.

15. The method of claim 13, wherein generating the smart contract comprises applying a machine learning algorithm to the set of guidelines or the electronic document to generate one or more rules in the set of rules.

16. The method of claim 13, wherein the policy comprises a whitelist or a blacklist.

17. The method of claim 13, wherein the user request comprises a request to perform an action related to the electronic document, and wherein the method further comprises denying the action.

18. The method of claim 13, further comprising calling one or more other oracles, each other oracle configured to retrieve data related to a condition specified by a rule in the set of rules and provide the retrieved data to the smart contract.

19. The method of claim 13, wherein the request from the user is received while the user is granted access to the electronic document, and wherein the method further comprises:

receiving an event related to use by the user of the electronic document;

passing, by an oracle, the event to the smart contract, wherein the smart contract is configured to execute one or more of the rules in the set of rules based on the event and output a modified access right for the electronic document; and enforcing the modified access right.

20. The method of claim 13, further comprising:

receiving from the smart contract, a modified access right for the electronic document based on automatic execution of a rule in response to a triggering event; and enforcing the modified access right.

* * * * *